United States Patent
Hill, III et al.

(10) Patent No.: US 7,334,617 B2
(45) Date of Patent: Feb. 26, 2008

(54) SOLID RUBBER TIRE WITH FLEXIBLE HUB AND REPLACEABLE TIRE TREAD

(75) Inventors: Giles A. Hill, III, P.O. Box 809, Idabel, OK (US) 74745; Duane S. Birdsong, Idabel, OK (US)

(73) Assignee: Giles A. Hill, III, Idabel, OK (US)

( * ) Notice: Subject to any disclaimer, the term of this patent is extended or adjusted under 35 U.S.C. 154(b) by 113 days.

(21) Appl. No.: 11/127,764

(22) Filed: May 12, 2005

(65) Prior Publication Data

US 2005/0257871 A1 Nov. 24, 2005

Related U.S. Application Data

(60) Provisional application No. 60/571,964, filed on May 18, 2004.

(51) Int. Cl.
  *B60B 9/10* (2006.01)
  *B60B 7/00* (2006.01)
  *B60B 5/02* (2006.01)

(52) U.S. Cl. .............. 152/47; 152/7; 152/40; 152/246; 301/5.306; 301/64.301; 301/64.706

(58) Field of Classification Search .......... 152/40, 152/47, 48, 50, 51, 52, 302, 303, 323, 5, 152/7, 246, 393, 394, 379.3, DIG. 18; 301/5.306, 301/5.308, 64.706, 64.301
See application file for complete search history.

(56) References Cited

U.S. PATENT DOCUMENTS

| | | | |
|---|---|---|---|
| 876,537 A * | 1/1908 | Garchey | 152/51 |
| 2,083,766 A * | 6/1937 | Wittkopp | 152/379.3 |
| 2,267,084 A * | 12/1941 | De La Rosa | 152/7 |
| 2,609,026 A * | 9/1952 | Luchsinger-Caballero | 152/176 |
| 3,329,193 A | 7/1967 | Mosebach | |
| 3,455,753 A * | 7/1969 | Schelkmann | 156/96 |
| 4,096,900 A | 6/1978 | Olsen | |
| 4,153,303 A * | 5/1979 | Tanner | 301/64.706 |
| 4,351,380 A | 9/1982 | Pilliod, Jr. | |
| 4,966,212 A | 10/1990 | Hill | |
| 5,053,095 A | 10/1991 | Hill | |
| 5,211,213 A | 5/1993 | Hicks | |
| 5,313,994 A | 5/1994 | Hill, III et al. | |
| 5,630,758 A | 5/1997 | Rivin | |
| 6,068,343 A * | 5/2000 | Madore et al. | 301/5.308 |
| 6,142,203 A | 11/2000 | Bickford | |
| 6,561,241 B2 | 5/2003 | Rayman | |
| 6,619,351 B2 * | 9/2003 | Rayman | 152/170 |
| 6,688,355 B2 * | 2/2004 | Rayman | 152/185 |
| 2005/0247389 A1* | 11/2005 | Fukunaga | 152/302 |

\* cited by examiner

*Primary Examiner*—Russell D. Stormer
*Assistant Examiner*—Kip Kotter
(74) *Attorney, Agent, or Firm*—Osha Liang LLP; John W. Montgomery

(57) ABSTRACT

A solid rubber tire with a flexible drive hub having a multiplicity of hub ribs and grooves formed around the periphery of the flexible drive hub and a solid rubber tire tread replaceably mounted on the flexible drive hub having a multiplicity of interior tread grooves and ribs formed around an interior surface of the tire tread, the tread grooves and ribs sized and shaped for interlocking engagement with the multiplicity of ribs and grooves formed around the periphery of the flexible drive hub.

6 Claims, 5 Drawing Sheets

SOLID RUBBER TIRE WITH FLEXIBLE HUB AND REPLACEABLE TIRE TREAD

RELATED APPLICATIONS

This application claims priority, pursuant to 35 U.S.C. §119(e), to U.S. Provisional Patent Application No. 60/571,964 filed May 18, 2004. That application is incorporated by reference in its entirety.

BACKGROUND OF THE INVENTION

1. Field of the Invention

The invention relates generally to rubber tires and in particular to rubber tires with a flexible drive hub and a replaceable solid rubber tire tread 2. Background Art Tires with solid rubber tread have been devised and used for vehicles such as construction equipment. To reduce the weight of the wheel and tire assembly the metal rim is constructed with a large diameter, relative to a corresponding pneumatic tire and the tread layer is thinner than a corresponding pneumatic tire having the same tire diameter. For example, U.S. Pat. Nos. 4,966,212 and 5,053,095 disclose solid rubber tire and wheel assemblies. U.S. Pat. No. 5,313,994 discloses improvements for preventing tire tread from slipping relative to the rim under the significant torque applied by heavy construction equipment. the tire is generally formed by bonding a layer of rubber to the metal rim and then bonding additional layers one to the next until the desired outside tire diameter is achieved. The layers are applied as raw rubber and then the entire wheel and tire assembly is placed in a large mold under pressure and heated to vulcanize the rubber.

U.S. Pat. No. 6,089,292, discloses a further improvement in the flexibility of solid rubber tires.

Presently, the tread of solid rubber tires is bonded directly to a metal rim that is bolted to the axle of the vehicle. When a tread ultimately wears out, the entire wheel and tire assembly is replaced on the vehicle. In many instances it is cost effective to remove the worn tire layer from the rim and reapply a tire tread with the process of raw rubber layers, bonding, molding and vulcanizing as described above.

SUMMARY OF INVENTION

One aspect of the present invention provides a solid rubber tire tread that is designed to be replaceably mounted on a flexible rubber drive hub.

Another aspect of the invention provides a solid rubber tire construction that is provided with a tread mounted on a flexible rubber drive hub so that relative slippage is prevented.

Another aspect of the invention provides a solid rubber tire and metal rim construction that is provided with a solid rubber tread mounted on a two piece drive hub including flexible rubber members connectable to the tread and bonded to metal rim portions that fasten to the axle of a vehicle.

Other aspects and advantages of the invention will be apparent from the following description and the appended claims.

DETAILED DESCRIPTION

Figure 1:
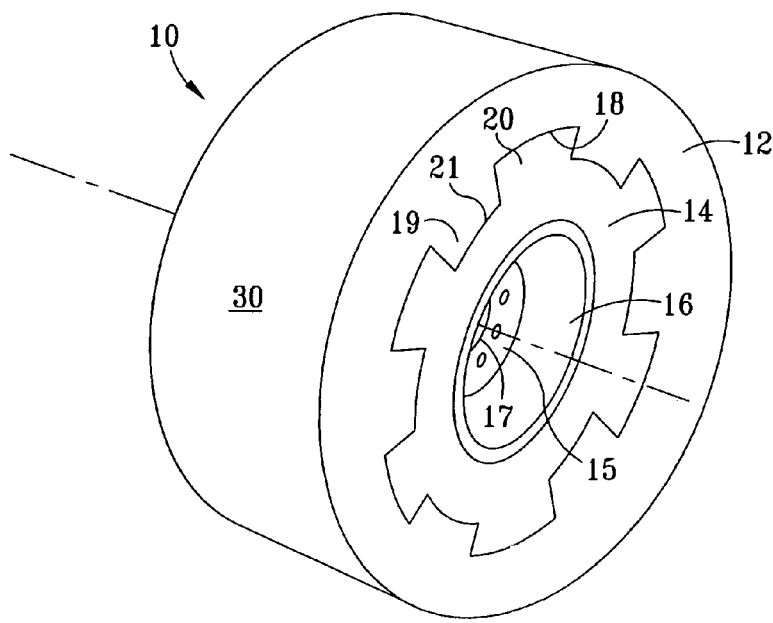
FIG. 1 is a perspective view of a solid rubber tire with a replaceable tire tread mounted on a flexible drive hub.

FIG. 1 depicts a solid rubber tire 10 with a solid rubber tire tread 12 mounted on a flexible drive hub 14. The flexible drive hub 14 is bonded to a wheel rim 16. The metal rim 16 is provided with a mounting plate 15 having holes 17 appropriately positioned for securing the tire assembly to an axle of a vehicle (not shown). In certain useful embodiments the solid rubber tire is adapted for use on vehicles such as tractors, front end loaders, bull dozers or other construction equipment. In one embodiment, the flexible drive hub 14 is constructed of solid rubber bonded or otherwise secured to the metal rim 16 (e.g., by vulcanization of the rubber in a mold under heat and pressure). The solid rubber tire tread 12 is replaceably mounted on the drive hub 14 using a multiplicity of ribs and grooves. Grooves 18 and ribs 19 of the tire tread 12 are substantially the mirror image of the ribs 20 and grooves 21 of the drive hub 14 and sized for press fit engagement.

In one embodiment, to facilitate pressing the drive hub 14 into the replaceable tire tread 12, the ribs 19 and 20 and the grooves 18 and 21 may also be aligned substantially parallel to the axis 11 and evenly spaced circumferentially around the interior surface of the tire tread 12.

Figure 2:
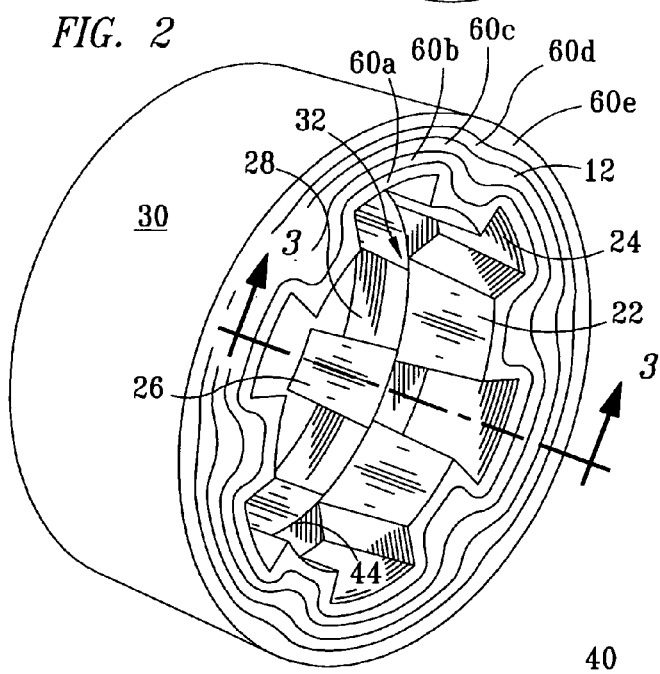
FIG. 2 is a perspective view of a molded solid rubber tire tread.

With reference also to FIG. 2, the construction of one useful embodiment of the replaceable tire tread 12 may be understood. For example, the tire tread 12 may be formed in a mold (not shown), in which the multiplicity of ribs 19 and grooves 18 of FIG. 1 includes of a first plurality of ribs 22 and grooves 24 and a second plurality of ribs 26 and grooves 28 that are molded into rubber material of which the tire tread 12 is formed. Those skilled in the art will appreciate from the present disclosure that the rubber material can be made to conform to the shape of a mold, under heat and pressure. Thus the described tire treads may be formed using molding processes to form the shape of the tire tread 12, including an exterior contact surface 30 and an interior mounting surface 32. The rolling contact surface 30 of the tire tread may be flat, rounded, or another shape. The tread may also be formed with a slick surface or with grooves, channels, studs, or other traction configurations without departing from the invention. In the embodiment of the invention shown, pluralities of ribs 22 and 26 and pluralities of grooves 24 and 28 are formed into the interior mounting surface 32 with an alternating rib and groove pattern for purposes of replaceably mounting the tire tread onto a rubber hub mechanism. The first set of the plurality of ribs 22 and grooves 24 and the second set of the plurality of the ribs 26 and grooves 28 are formed around the interior surface 32, with the first set and the second set offset from one another.

Figure 3:
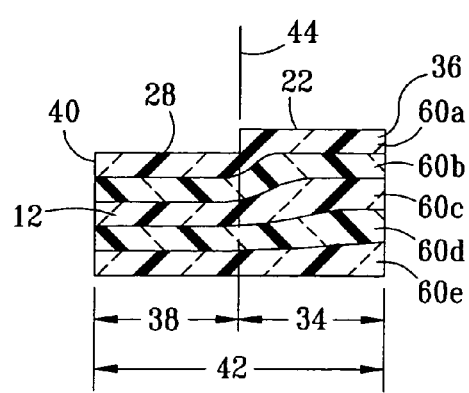
FIG. 3 is a section view taken along section line 3-3 of FIG. 2.

Referring to FIG. 3, it will be more fully understood that in one embodiment of the invention the first set of ribs 22 (and grooves 24 shown in FIG. 2) extend a predetermined distance 34 across the interior mounting surface 32 from a first side wall 36 and the second set of (ribs 26 shown in FIG. 2) and grooves 28 extend another distance 38 across the interior mounting surface 32 from the opposite side wall 40. In the embodiment depicted in FIG. 3, the distance 38 and the distance 34 are approximately equal, each distance approximately one-half the total width 42 of the tire tread 12 so that the sum of distances 34 and 38 is approximately equal to the width 42 of the interior mounting surface 30 of the tire tread 12. In this embodiment, the ribs 22 meet with the offset grooves 28 substantially at an imaginary interior circumferential midline 44 halfway between side walls 36 and 40 of the tire tread 12.

Figure 4:
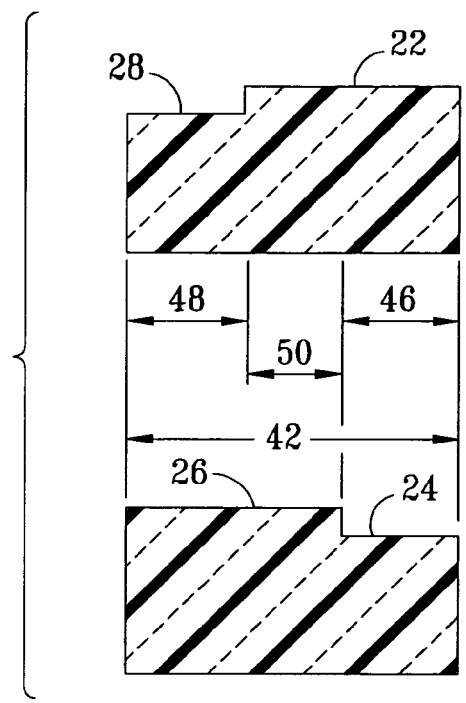
FIG. 4 is a section view of an alternative embodiment of a tire tread along a radial plane through a rib and a groove in a position similar to the position shown in FIG. 3.

In an alternative embodiment, as illustrated in the cross-sectional view of FIG. 4, a predetermined distance 46 (note, grooves 24 extend the same distance and are not shown in FIG. 3, see FIG. 2) may be less than one half the total width 42 across the interior surface 32 of the tire tread 12. A predetermined distance 48 of the grooves 28, may also be less than one half the total width 42. In this embodiment, a middle ridge portion of width 50 results between the first set of ribs 22 and grooves 24 and a second set of ribs 26 and grooves 28.

Figure 5:
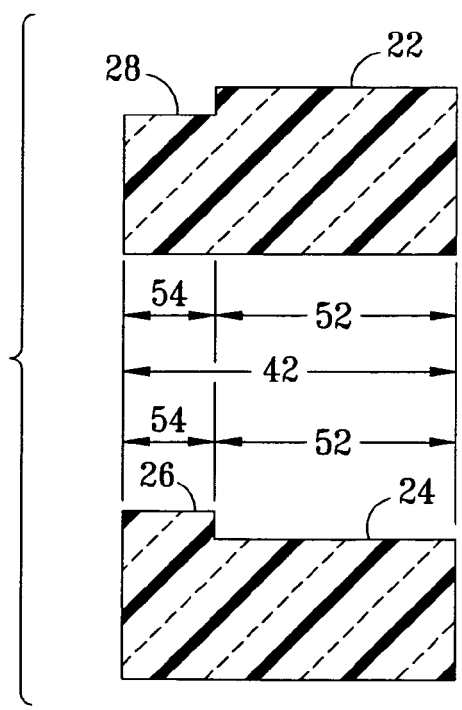
FIG. 5 is a section view of the alternative embodiment of a tire tread of FIG. 4 along a radial plane through an offset groove and rib.

In yet another alternative embodiment, as illustrated by the cross-sectional view of FIG. 5, the predetermined distance 52 of the ribs 22 and grooves 24 may be more than one-half of the total width 42 across the tire tread 12 and the distance 54 of the ribs 26 and grooves 28, may be less than one-half the total width 42. The distances 52 and 54 need not be equal to each other and their sum need not be equal to the total width 42, but according to an alternative embodiment of the invention the sum of distances 52 and 54 may be equal to the total width 42.

Referring again to FIG. 2, it will be understood that the tire tread 12 may be formed according to one embodiment of the invention, using a plurality of raw rubber layers 60a through 60e. The plurality of layers of raw rubber material 60a through 60e are wrapped around a mold mandrel formed of two pieces, the rubber layers are bonded to each other layer and successively wrapped around each prior layer to build up a desired tire tread thickness. The mandrel and layers of rubber are placed into a tread mold and heated under pressure to mold, bond, and vulcanize the tire tread into a replaceable tire tread structure 12. It will be understood that the method of forming the replaceable tire tread 12 is provided as an example and that other methods resulting in the claimed structure may also be used without departing from certain aspects of the invention. For a further example, any number of layers of raw material may be used to form the replaceable tire tread 12 without departing from certain aspects of the invention.

According to one embodiment of the invention, the replaceable tire tread 12 may be composed of rubber having different hardness and/or different strength characteristics. For example, the layer, the layers or the portion of the tire tread forming the interior mounting surface 32 with multiplicity of ribs and grooves may be composed of a rubber material that is harder, more rigid, or stronger than other portions of the tire tread 12. For example, an interior layer 60a of rubber having a hardness between about 75 to 85, when cured, or in another example of about 79 to about 81 durometer on the Shore A scale has been found to be useful for purposes of replaceability and drive strength. In an alternative embodiment, the interior layer 60a can also be usefully provided with reinforcing materials such as a reinforcing fabric material imbedded into the rubber to increase the strength. The hardness of the rubber can be usefully transitioned to softer wear layers of between about 70 to 60 durometer, for example about 65 durometer. The tread may also be constructed with portions of the layers having varied hardness (not shown) or with holes formed into the tread axially inward from the side walls (not shown) to provide added flexibility and a relatively smooth ride.

Figure 6:
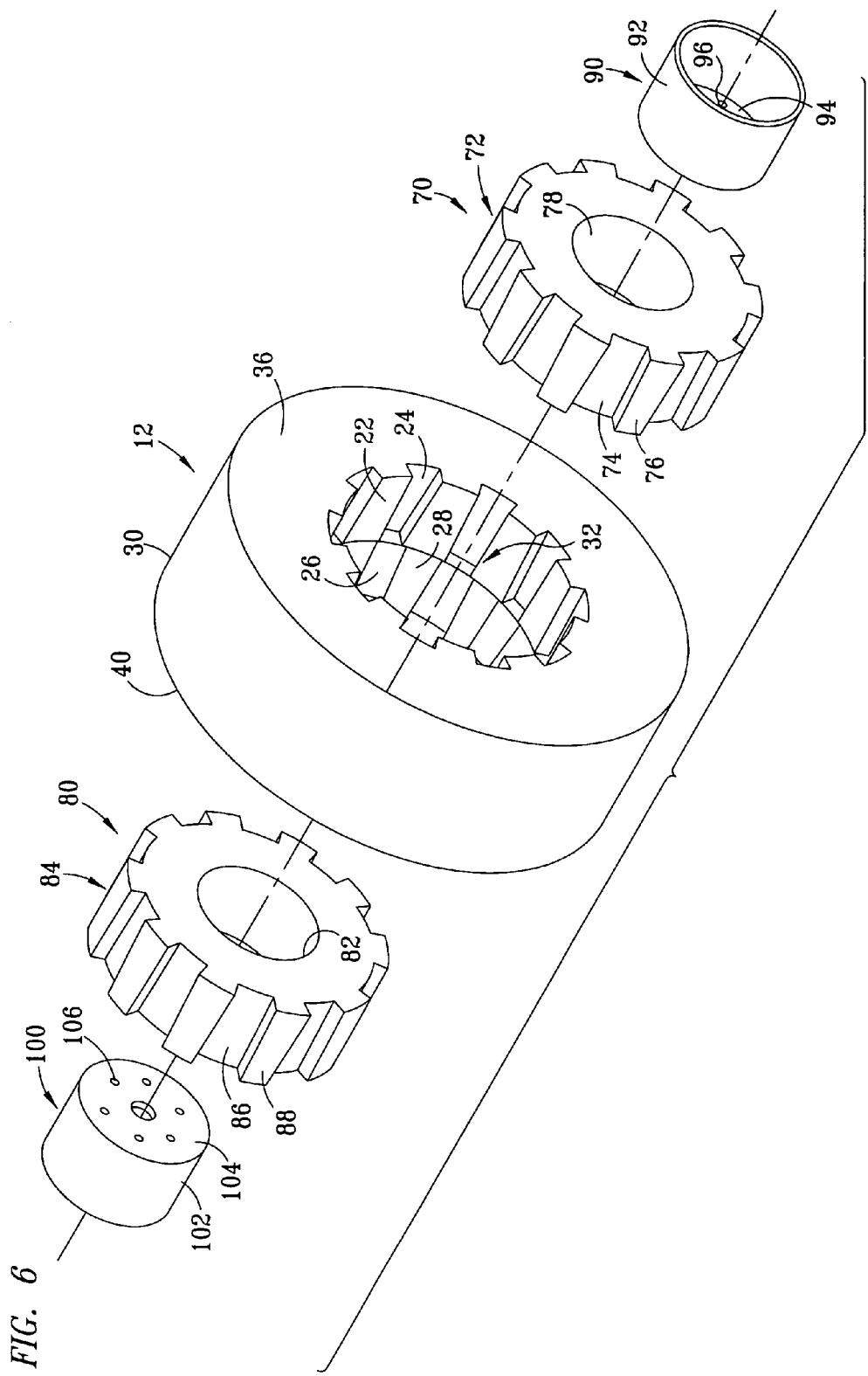
FIG. 6 is an exploded perspective assembly view of a solid rubber tire tread with flexible drive hub.

In FIG. 6 the solid rubber tire tread 12 is shown, in an assembly view, together with drive hub portions 70 and 80 that form the assembled drive hub 14 of FIG. 1, and the metal rim portions 90 and 100, that form the assembled metal rim 16 of FIG. 1. The replaceable tire tread 12, as discussed previously, includes side walls 36 and 40, internal surface 32 and outer rolling contact surface 30. The internal surface or mounting surface 32 defines the multiplicity of ribs and grooves for replaceably mounting the tire tread 12 on the drive hub assembly 14 comprising hub portions 70 and 80 (shown assembled in FIG. 7 below). In one embodiment as shown, the first plurality of grooves 24 and ribs 22 and the second plurality of grooves 28 and ribs 26 are formed circumferentially around the interior surface 32 of the replaceable tread 12. In the embodiment depicted, the first and second pluralities of grooves 24, 28 and ribs 22, 26 are offset from one another such that each rib 22 is generally aligned with each groove 28, and each groove 24 is generally aligned with each rib 26.

The first drive hub portion 70 is provided with an exterior surface 72 defining a plurality of grooves 74 and ribs 76 circumferentially around the surface 72. An interior surface 78 receives and is bonded to a metal rim portion 90 at a rim surface 92. The rim portion 90 is provided with a mounting flange portion 94 having fastening holes 96 formed therein. Similarly, the second drive hub portion 80 has an internal surface 82 that receives and is bonded to a metal rim portion 100 at an external rim surface 102. The metal rim portion 100 is also provided with a mounting flange portion 104 having fastening holes 106 corresponding in number and position to fastening holes 96 of rim portion 90. In the embodiment depicted the assembled flange portions 94 and 104 form the mounting flange 15 (as shown in FIG. 1). The second drive hub portion 80 is provided with a plurality of grooves 86 and ribs 88 circumferentially spaced around the exterior surface 84. The grooves 74 and 86 of drive hub portions 70 and 80, respectively, are sized, shaped and spaced for receiving the ribs 22 and 26 of the replaceable solid rubber tire tread 12. Similarly, the plurality of grooves of the solid rubber tire 12 are sized, shaped and spaced for receiving and the ribs 76 and 88 of the first and second drive hub portions 70 and 80, respectively. Thus, the ribs 22 and 26 and the grooves 24 and 28 of the replaceable solid rubber tire tread 12 are substantially the mirror image of the grooves 74 and 86 and the ribs 76 and 88 of drive hub portions 70 and 80, respectively.

The procedure for placing the replaceable tire tread 12 onto the drive hubs 70 and 80 involves pressing the hubs into the solid rubber tire tread from either direction. The flexible rubber drive hubs are pressed from both sides 36 and 40 into the replaceable tire tread 12. Each rib 76 of the first drive hub portion 70 mates with each of the grooves 24 of the tire tread 12 and each of the ribs 22 of the tire tread 12 mates with each of the grooves 74 of the first drive hub portion 70. Similarly, each of the ribs 26 of the tire tread 12 mates with each of the grooves 86 of the second drive hub 80 and each of the grooves 28 of the tire tread 12 mates with each of the ribs 88 of the second drive hub 80. The ribs and grooves become interlocked with one another.

The drive hubs 70 and 80 are therefore pushed from opposite directions into the replaceable tire tread 12. In one alternative embodiment the interlocking ribs are sized slightly larger than the corresponding grooves for an appropriate amount of interference fit. A substantial amount of pressure may be required in order to insert the drive hub portions 70 and 80 completely into the replaceable tire tread 12. According to this embodiment of the invention the tight fit helps to keep the tire tread in place on the hub assembly when subjected to heavy loading or torque as can be developed by heavy construction vehicles and equipment. Assembly of the replaceable tread 12 onto the hub portions 70 and 80 will compress the rubber of both the hub potions and the tire tread and may cause a bulge at the interface. To facilitate complete insertion, fasteners such as bolts or other fastening devices may be used to pull flange portions 94 and 104 into close proximity with each other, or into abutment with each other, so that to the drive hubs 70 and 80 are inserted completely into the replaceable tire tread 12. Depending upon the axle mounting size and position, the same flange portions 94 and 104 may be used to mount the solid rubber wheel and tire assembly onto the vehicle. Alternatively, one set of flanges 94 and 104 may be provided to draw the hub portions 70 and 80 together and another mounting flange (not shown), may be attached to either one of the hub portions to mount the assembled wheel and replaceable tire to the vehicle.

Figure 7:
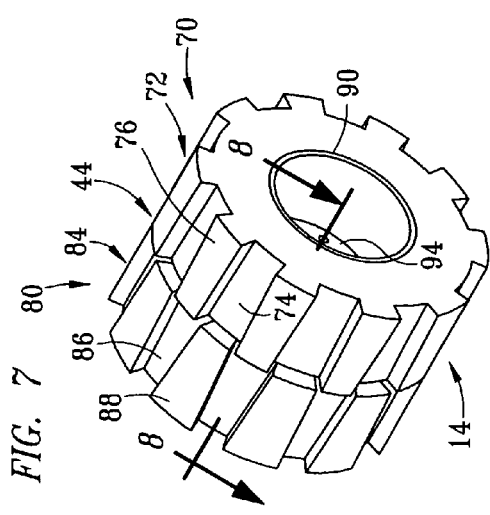
FIG. 7 is a perspective view of a two part flexible drive hub assembly, without the replaceable tire tread mounted thereon.

With reference to FIG. 7, an assembled two-piece flexible drive hub 14, formed of hub portions 70 and 80, is depicted without the replaceable tire 12 for purposes of clarity. In this embodiment, an offset is shown between the ribs 76 and ribs 88 and between the grooves 74 and 86. Each of the ribs 76 is generally aligned with each of the grooves 86 and each of the ribs 88 is generally aligned with each of the grooves 74.

To facilitate insertion into the replaceable tire tread 12, the ribs 76 and 88 are tapered smaller toward the midline 44 and larger toward the exterior sides, 36 and 40. The grooves 74 and 86 are therefore tapered in the opposite direction; namely, wider circumferentially at the midline and narrower at the sides. The size, shape and taper of each rib 76 and 88 and each groove 74 and 86 of the drive hub portions 70 and 80, respectively, corresponds to the size, shape and taper of the ribs 22 and 26 and the grooves 24 and 28 of the replaceable tire tread 12 of FIG. 6. As discussed above, in an alternative embodiment an amount of over size at the ribs, and undersize at the grooves, may be provided to allow a tight press fit and a desired amount of rubber-to-rubber compression when the drive hub potions 70 and 80 are fully inserted into the replaceable tire tread 12. The taper construction of ribs and hubs also serves as a draft to facilitate molding and removal of the tread and the hub portions from molds during manufacture.

Figure 8:
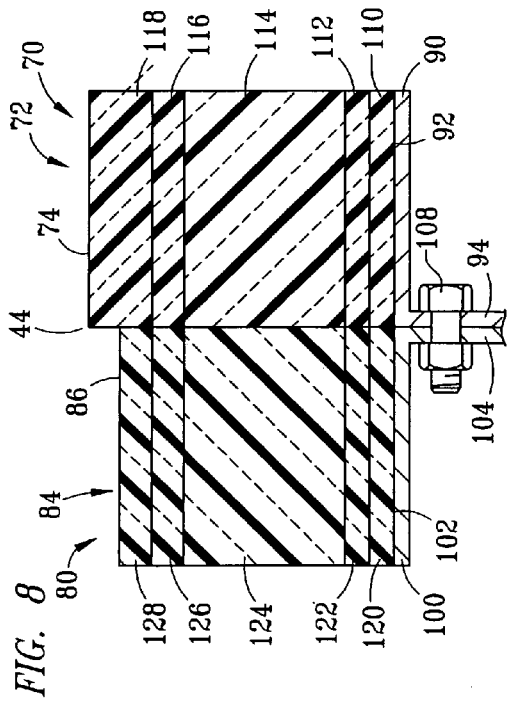
FIG. 8 shows a cross-section radially through the drive hubs of FIG. 7 taken along a section line 8-8 of FIG. 7.

FIG. 8 shows a cross-section radially through one of the drive hubs 70 and 80 taken along a section line 8-8 of FIG. 7. The flanges 94 and 104 are shown fastened together with a fastener device 108, such as a bolt and nut fastener, and for uniformity of force around the flanges 94 and 104 a plurality of such bolts and nuts are used.

At the bonding surface 92 of the rim 90, the drive hub 70 may be composed of a relatively hard rubber 110, for example a rubber having a hardness of about 80 durometer on a Shore A scale. The rubber in a transition layer 112 may have a hardness of about 65 durometer. A middle layer 114 may be provided as a cushioning layer and may have a hardness of about 35 durometer. An outer transition layer 116 may again have a hardness of about 65 durometer. The outer drive layer 118, which is adjacent to the contact surface 72, may have a hardness of about 80 durometer to provide durability and strength at the mounting surface. In one alternative embodiment, the outer drive layer 118 can also be usefully provided with reinforcing materials such as a reinforcing fabric material embedded into the rubber.

Similarly, at the bonding the surface 102 of the rim 100, the drive hub 80 may be composed of a relatively hard rubber 120, for example a rubber having a hardness of about 80 durometer on a Shore A scale. The rubber in a transition layer 122 may have a hardness of about 65 durometer. A middle layer 124 maybe provided as a cushioning layer and may have a hardness of about 35 durometer. An outer transition layer 126 may again have a hardness of about 65 durometer. The outer drive layer 128, which is adjacent to the contact surface 84, may have a hardness of about 80 durometer to provide durability and strength at the mounting surface. In one alternative embodiment, the outer drive layer 128 can also be usefully provided with reinforcing materials such as a reinforcing fabric material imbedded into the rubber.

Figure 9:
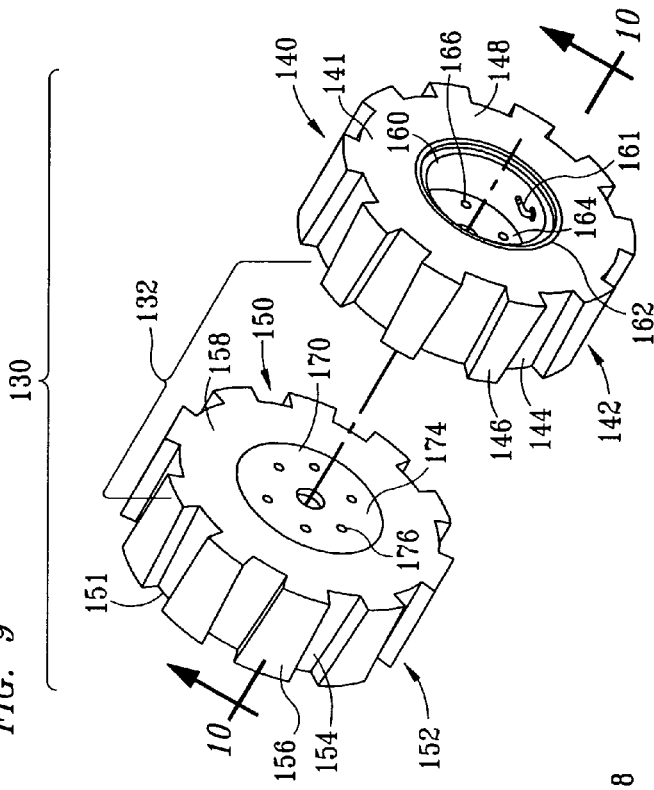
FIG. 9 is a perspective assembly view of an alternative embodiment of a two part flexible drive hub, without the replaceable tire tread mounted thereon.
Figure 10:
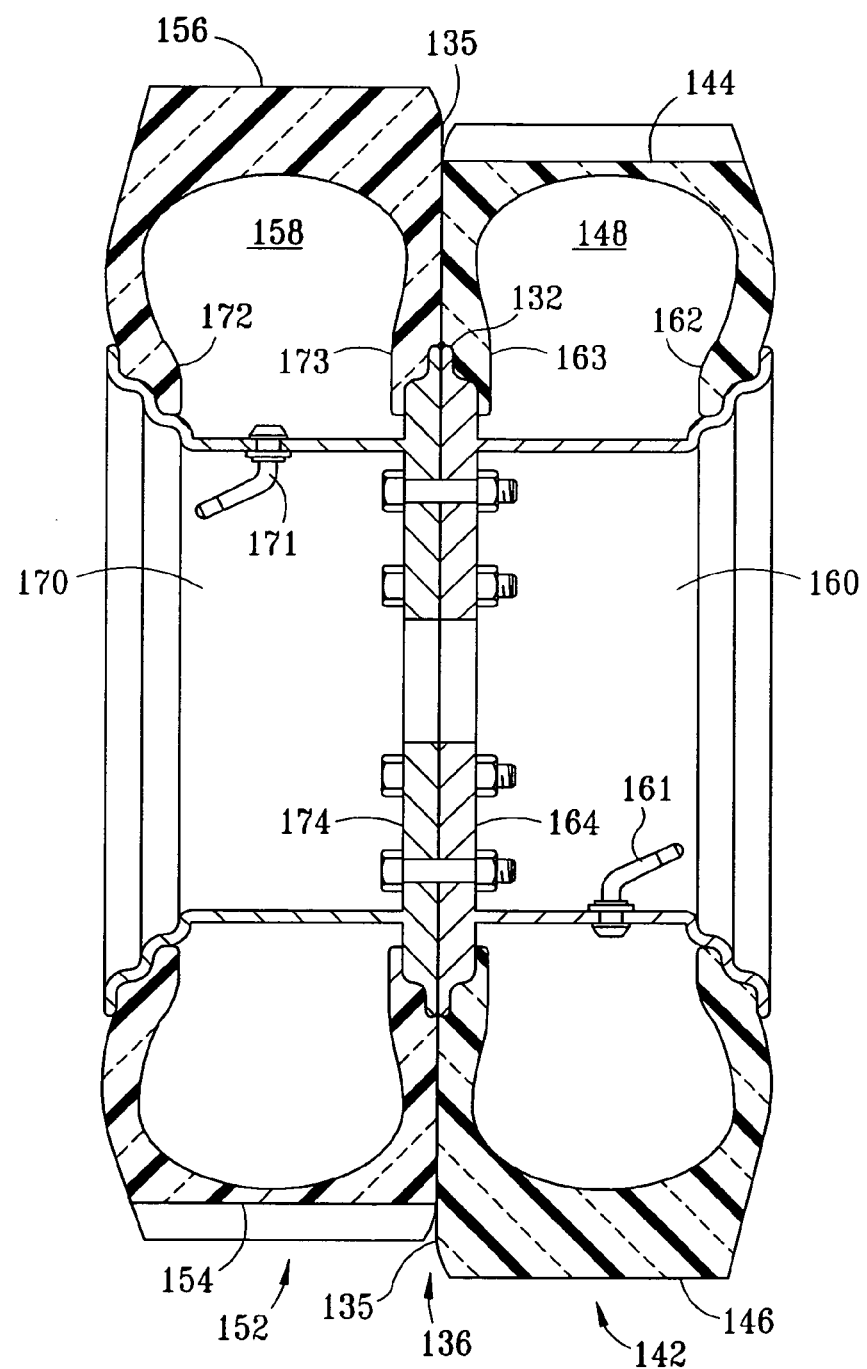
FIG. 10 shows a cross-section radially through the assembled drive hubs of FIG. 9 taken along a section line 10-10 of FIG. 9.

In FIGS. 9 and 10 an alternative embodiment of a drive hub assembly 130 that comprises pneumatically inflated hub portions 140 and 150. The solid rubber tire tread 12 is not shown in FIGS. 9 and 10. It will be understood based upon the present disclosure that the same solid rubber tire tread 12, as described above and shown in FIGS. 1, 2, and 6, may be used with the alternative hub assembly 130. The drive hub portions 140 and 150 are aligned coaxially and fastened together to form the assembled drive hub 130. Metal rim portions 160 and 170 form the assembled metal rim 132.

Referring to FIG. 9, the first drive hub portion 140 is formed with a pneumatic tire 148 having an exterior surface 142 defining a plurality of grooves 144 and ribs 146 circumferentially around the surface 142. The pneumatic tire 148 is mounted on a metal rim portion 160 and inflated, as with a valve stem 161, so that the tire 148 securely and sealingly engages the rim 160 along rim surfaces 162 and 163 (shown in FIG. 10). The rim portion 160 is provided with a mounting flange portion 164 having fastener holes 166 formed therein. Similarly, the second drive hub portion 150 is formed with a pneumatic tire portion 158 that has an exterior surface 152 defining a plurality of grooves 154 and ribs 156. The pneumatic tire 158 is mounted on a metal rim portion 170 and inflated, as with a valve stem 171 and compressed air, so that the tire 158 securely and sealingly engages the rim 170 along rim surfaces 172 and 173 (shown in FIG. 10). The rim portion 170 is provided with a mounting flange portion 174 having fastener holes 176 formed therein and corresponding in number and position to fastening holes 166 of rim portion 160. In the embodiment depicted, when assembled the flange portions 164 and 174 will form a wheel mounting flange similar to flange 15 (as shown in FIG. 1).

The grooves 144 and 154 of drive hub portions 140 and 150, respectively, are sized, shaped and spaced for receiving the ribs 22 and 26 of the replaceable solid rubber tire tread 12 (not shown in FIGS. 9 and 10). Similarly, the plurality of grooves 24 and 28 of the solid rubber tire 12 are sized, shaped and spaced for receiving the ribs 146 and 156 of the first and second drive hub portions 140 and 150, respectively. Thus, the ribs 22 and 26 and the grooves 24 and 28 of the replaceable solid rubber tire tread 12 are substantially the mirror image of the grooves 144 and 154 and the ribs 146 and 156 of drive hub portions 140 and 150, respectively. When assembled the hub portions 140 and 150 form the flexible drive hub 130. In this embodiment, an offset is shown between the ribs 146 and ribs 156 and between the grooves 144 and 154. Each of the ribs 146 is offset circumferentially from ribs 156 so that there is an overlapping portion 135. The amount of overlap can vary without departing from certain aspects of the invention. In the embodiment depicted each of the ribs 146 is generally aligned with each of the grooves 154 and each of the ribs 156 is generally aligned with each of the grooves 144 to maximize the area of the overlapping portions 135.

The procedure for placing the replaceable tire tread 12 onto the drive hubs 140 and 150 involves pressing the drive hubs 140 and 150 into the solid rubber tire tread from opposite directions along the same axis. Each rib 146 of the first drive hub portion 140 mates with each of the grooves 24 of the tire tread 12, and each of the ribs 22 of the tire tread 12 mates with each of the grooves 144 of the first drive hub portion 140. Similarly, each of the ribs 26 of the tire tread 12 mates with each of the grooves 154 of the second drive hub 150 and each of the ribs 156 of the second drive hub 150 mates with each of the grooves 28 of the tire tread 12. The ribs and grooves become interlocked with one another when pressed into contact with the overlap portions 135. The overlap 135 prevents the tire tread from moving axially relative to the drive hub assembly 130.

The drive hubs 140 and 150 are therefore pushed from opposite directions into the replaceable tire tread 12. In one alternative embodiment the interlocking ribs are sized slightly larger than the corresponding grooves for an appropriate amount of interference fit. A substantial amount of pressure may be required in order to insert to the drive hub portions 140 and 150 completely into the replaceable tire tread 12. According to this embodiment of the invention the tight fit helps to keep the tire tread in place on the hub assembly when subjected to heavy loading or torque as can be developed by heavy construction vehicles and equipment. Assembly of the replaceable tread 12 onto the hub portions 140 and 150 will compress the rubber of both the hub portions and the tire tread and may cause a bulge at the interface. To facilitate complete insertion, fasteners such as bolts or other fastening devices may be used to pull flange portions 164 and 174 into close proximity with each other, or into abutment with each other, so that the drive hub portions 150 and 160 are inserted completely into the replaceable tire tread 12. Depending upon the axle mounting size and position, the same flange portions 164 and 174 may be used to mount the solid rubber wheel and tire assembly onto the vehicle. Alternatively, one set of flanges 164 and 174 may be provided to draw the hub portions 140 and 150 together and another mounting flange (not shown), may be attached to either one of the hub portions to mount the assembled wheel and replaceable tire to the vehicle.

In one alternative embodiment, to facilitate insertion into the replaceable tire tread 12, the ribs 146 and 156 are tapered smaller toward a midline 136 and larger toward the exterior sides 141 and 151. The grooves 144 and 154 are therefore tapered in the opposite direction; namely, wider circumferentially at the midline 136 and narrower at the sides 141 and 151. The size, shape and taper of each rib 146 and 156 and each groove 144 and 154 of the drive hub portions 140 and 150, respectively, corresponds to the size, shape and taper of the ribs 22 and 26 and the grooves 24 and 28 of the replaceable tire tread 12 (see FIGS. 2 and 6). As discussed above, in an alternative embodiment an amount of over size at the ribs, and undersize at the grooves, may be provided to allow a tight press fit and a desired amount of rubber-to-rubber compression when the drive hub potions 140 and 150 are fully inserted into the replaceable tire tread 12. The taper construction of ribs and hubs also serves as a draft to facilitate molding and removal of the tread and the hub portions from molds during manufacture.

In another alternative embodiment the pneumatic tire portions 148 and 158 can be partially deflated to decrease the diameter slightly before being pressed or otherwise positioned in the replaceable tire tread 12. Once the external ribs 146 and 156 and grooves 144 and 154 of the hubs are properly aligned with internal ribs 22 and 26 and grooves 24 and 28 of the replaceable tire tread 12, the pneumatic tire portions 148 and 158 may be re-inflated to expand into the replaceable tire tread 12. Dismounting the replaceable tire tread 12 from the hub 130 may also be facilitated by first partially deflating the pneumatic tire portions 148 and 158, removing the replaceable tire tread 12, replacing the tire tread 12 with another one and then re-inflating the pneumatic tire portions 148 and 158 to facilitate firm engagement.

FIG. 10 shows a cross-section radially through the drive hub assembly 130 formed by fastening the drive hubs 140 and 150 together. The section view is taken along a plane lying on a diameter through the assembled hub 130. The flanges 164 and 174 are shown fastened together with a fastener device 178, such as a bolt and nut fastener, and for uniformity of force around the flanges 164 and 174 a plurality of such bolts and nuts are used. The pneumatic tire portions 148 and 158, when inflated, are held on the rims by the internal pressure. Thus, the replaceable solid tire tread 12 (not shown in FIG. 10) is held in place with the engaged ribs and grooves and power is transferred to the rolling tread from the vehicle axle to the metal rims, to the tire, to the external ribs and grooves of the drive hub 130, to the internal grooves and ribs of the tire tread 12, and to the solid tire tread. The solid tire tread 12 withstands impact, sharp object damage, and wear during use. When the wear or damage to the solid rubber tread exceeds acceptable limits, the tread can be replaced without replacing the entire drive hub 130.

Those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A rubber tire, comprising:
   a flexible drive hub assembly comprising at least two flexible drive hub portions, each flexible drive hub portion detachably fastenable to the other co-axially aligned and each flexible drive hub portion comprising a multiplicity of alternating raised hub ribs and depressed hub grooves formed around the periphery of each flexible drive hub portion; and
   a solid rubber tire tread replaceably mounted on the flexible drive hub having a multiplicity of indented tread grooves and protruding tread ribs formed around an interior surface of the tire tread, the indented grooves and protruding ribs sized and shaped for interlocking engagement with the multiplicity of raised ribs and depressed grooves formed around the periphery of the flexible drive hub assembly, and wherein the at least two flexible drive hub portions are fastenable to each other coaxially aligned and with the raised ribs on one of the flexible drive hub portions circumferentially offset from the raised ribs of another of the flexible drive hub portions, wherein the indented grooves and protruding ribs in the interior surface of the tire tread comprise first and second sets of tread grooves and ribs, wherein grooves and ribs of the first set of tread grooves and ribs are aligned for engagement with the raised ribs and depressed grooves of the one hub portion and grooves and ribs of the second set of tread grooves and ribs are aligned for engagement with the raised ribs and depressed grooves of the other flexible drive hub portion when the at least two flexible drive hub portions are fastened coaxially to each other to form the flexible drive hub assembly.

2. A rubber tire, comprising:
a flexible drive hub assembly comprising at least two flexible drive hub portions, each flexible drive hub portion detachably fastenable to the other co-axially aligned and each flexible drive hub portion comprising a multiplicity of alternating raised hub ribs and depressed hub grooves formed around the periphery of each flexible drive hub portion;
a solid rubber tire tread replaceably mounted on the flexible drive hub having a multiplicity of indented tread grooves and protruding tread ribs formed around an interior surface of the tire tread, the indented grooves and protruding ribs sized and shaped for interlocking engagement with the multiplicity of raised ribs and depressed grooves formed around the periphery of the flexible drive hub assembly; and
wherein the flexible drive hub portions comprise solid rubber bonded circumferentially around a metal wheel rim by vulcanization of the rubber in a mold under heat and pressure.

3. A rubber tire, comprising:
a flexible drive hub assembly comprising at least two flexible drive hub portions, each flexible drive hub portion detachably fastenable to the other co-axially aligned and each flexible drive hub portion comprising a multiplicity of alternating raised hub ribs and depressed hub grooves formed around the periphery of each flexible drive hub portion;
a solid rubber tire tread replaceably mounted on the flexible drive hub having a multiplicity of indented tread grooves and protruding tread ribs formed around an interior surface of the tire tread, the indented grooves and protruding ribs sized and shaped for interlocking engagement with the multiplicity of raised ribs and depressed grooves formed around the periphery of the flexible drive hub assembly; and
wherein the multiplicity of interior tread grooves and ribs formed around the interior surface of the tire tread comprise a first set of tread grooves and ribs extending in an axial direction inward from a first sidewall of the tire tread a predetermined first distance and a second set of tread grooves and ribs extending in an axial direction inward from a second side wall of the tire tread a second predetermined distance, the first and second sets of tread grooves and ribs offset circumferentially from each other so that grooves of the first set of tread grooves and ribs at least partially overlap with the ribs of the second set of grooves and ribs and the ribs of the first set of tread grooves and ribs at least partially overlap with the grooves of the second set of grooves and ribs; and the flexible drive hub assembly comprises:
a first flexible hub portion having a first plurality of alternating raised hub ribs and depressed hub grooves; and
a second flexible hub portion having a second plurality of alternating raised hub ribs and depressed hub grooves correspondingly sized for firmly engaging with the indented grooves and protruding ribs of the tire tread, wherein the first and second hub portions may be detachably inserted from opposite directions of the first and second side walls of the tire tread, respectively, as far as the at least partial overlap between the first and second pluralities of offset tread grooves and ribs, and the first and second flexible hub portions may be detachably fastened together so that the first and second pluralities of hub ribs and grooves are detachably engaged with the multiplicity of tread grooves and ribs of the solid rubber tire tread, and wherein the first and second hub portions when fastened together are prevented by the overlap of the tread grooves and ribs from sliding beyond the overlap in the axial direction relative to the tire tread.

4. A replaceable solid rubber tire tread with a flexible drive hub comprising:
a first metal rim having a fastening flange;
a second metal rim having a fastening flange;
a first flexible drive hub bonded circumferentially around the first metal rim, the first flexible drive hub including a first plurality of hub ribs and grooves formed around the periphery of the flexible drive hub, the ribs and grooves having a first predetermined spacing;
a second flexible drive hub bonded circumferentially around the second metal rim, the second flexible drive hub including a second plurality of hub ribs and grooves formed around the periphery of the flexible drive hub, the ribs and grooves having a second predetermined spacing;
a replaceable tire tread having a first plurality of tread grooves and ribs formed around a first interior surface of the tire tread, the first plurality of tread grooves and ribs having a mirror image spacing to the first plurality of hub ribs and grooves of the first flexible hub and sized for receiving the first hub ribs and grooves, and a second plurality of tread grooves and ribs formed around a second interior surface of the tire tread having a mirror image spacing to the second plurality of hub ribs and grooves of the second flexible hub and sized for receiving the second hub ribs and grooves; and
a fastener for fastening the first and second flanges together so that the corresponding first and second flexible drive hub ribs and grooves on the first and second flexible drive hubs are held together inserted into the first and second mirror image tread grooves and ribs formed around the interior surfaces of the tire tread.

5. A replaceable rubber tire tread, comprising:
a tread having first and second side walls and an opening extending between the opposed side walls, the opening defining an interior surface having a predetermined width;
a first plurality of the ribs and grooves formed on the interior surface extending from the first side wall a first predetermined distance less than the width of the opening; and a second plurality of ribs and grooves formed on the interior surface offset from the first plurality of ribs and grooves and extending from the second side wall a second predetermined distance, wherein the first and second pluralities of ribs and grooves are offset circumferentially.

6. A flexible drive hub assembly for receiving a replaceable tire tread, comprising:

a first metal rim having a fastening flange;

a first flexible drive hub portion secured circumferentially around the first metal rim, the first flexible drive hub portion including a first plurality of hub ribs and grooves formed around the periphery of the first flexible drive hub portion, the ribs and grooves having a first predetermined circumferential spacing;

a second metal rim having a fastening flange;

a second flexible drive hub portion secured circumferentially around the second metal rim, the second flexible drive hub portion including a second plurality of hub ribs and grooves formed around the periphery of the second flexible drive hub portion, the ribs and grooves having a second predetermined circumferential spacing;

a fastener for fastening the first and second flanges together to form a hub assembly; and wherein the first and second flexible drive hub portions comprise solid rubber secured to the first and second metal rims by bonding.

* * * * *